US010000898B2

(12) United States Patent
Wachsmann

(10) Patent No.: US 10,000,898 B2
(45) Date of Patent: Jun. 19, 2018

(54) GROUND MILLING MACHINE AND METHOD FOR ADJUSTING THE STRIPPING PLATE OF A GROUND MILLING MACHINE

(71) Applicant: BOMAG GmbH, Boppard (DE)

(72) Inventor: Steffen Wachsmann, Koblenz (DE)

(73) Assignee: BOMAG GmbH, Boppard (DE)

( * ) Notice: Subject to any disclaimer, the term of this patent is extended or adjusted under 35 U.S.C. 154(b) by 201 days.

(21) Appl. No.: 14/973,972

(22) Filed: Dec. 18, 2015

(65) Prior Publication Data

US 2016/0186391 A1 Jun. 30, 2016

(30) Foreign Application Priority Data

Dec. 30, 2014 (DE) .................. 10 2014 019 606
Feb. 26, 2015 (DE) .................. 10 2015 002 426

(51) Int. Cl.
*E01C 23/08* (2006.01)
*E01C 23/088* (2006.01)
*G05B 19/00* (2006.01)

(52) U.S. Cl.
CPC ............ *E01C 23/088* (2013.01); *G05B 19/00* (2013.01)

(58) Field of Classification Search
CPC ............................ E01C 23/088; E01C 23/127
See application file for complete search history.

(56) References Cited

U.S. PATENT DOCUMENTS

| 4,723,867 | A | 2/1988 | Wirtgen | |
| 5,101,360 | A * | 3/1992 | Bennett | E01C 19/48 404/119 |
| 2004/0075330 | A1* | 4/2004 | Holl | E01C 23/088 299/39.2 |
| 2007/0139041 | A1 | 6/2007 | Steinich | |
| 2009/0108663 | A1* | 4/2009 | Berning | E01C 23/088 299/1.5 |

(Continued)

FOREIGN PATENT DOCUMENTS

| DE | 3528038 A1 | 2/1987 |
| DE | 102005060676 A1 | 6/2007 |

(Continued)

OTHER PUBLICATIONS

Espacenet, English Machine Translation of Abstract for DE102012012607A1, published Jan. 2, 2014 (1 page).

*Primary Examiner* — John J Kreck
(74) *Attorney, Agent, or Firm* — Wood Herron & Evans LLP

(57) ABSTRACT

The present invention relates to a ground milling machine, particularly a road milling machine, comprising a machine frame supported by travelling devices, a drive engine and a milling device arranged in a milling drum box, the milling drum box comprising a stripping plate which is height-adjustable by means of at least a first and a second actuator. Further, the present invention relates to a method for adjusting a stripping plate of a milling drum box of a ground milling machine, particularly a road milling machine. For the purpose of a reliable adjustment of the stripping plate, the present invention proposes using a monitoring device for detecting the adjustment of a first actuator and a control device for controlling the adjustment of a second actuator depending on the adjustment of the first actuator.

15 Claims, 3 Drawing Sheets

(56) References Cited

U.S. PATENT DOCUMENTS

2012/0128419 A1* 5/2012 Menzenbach .......... E01C 21/00
                                                                       404/76
2013/0140870 A1* 6/2013 Johnson .................. E01C 23/09
                                                                       299/1.5
2015/0091364 A1   4/2015 Kotting et al.

FOREIGN PATENT DOCUMENTS

| DE | 102007038677 A1 | 2/2009 |
| DE | 102012012607 A1 | 1/2014 |

\* cited by examiner

Fig. 3
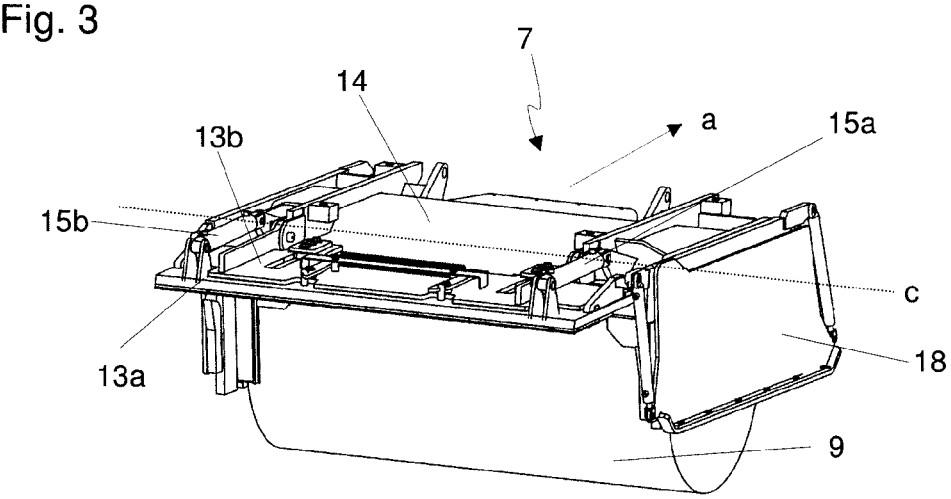
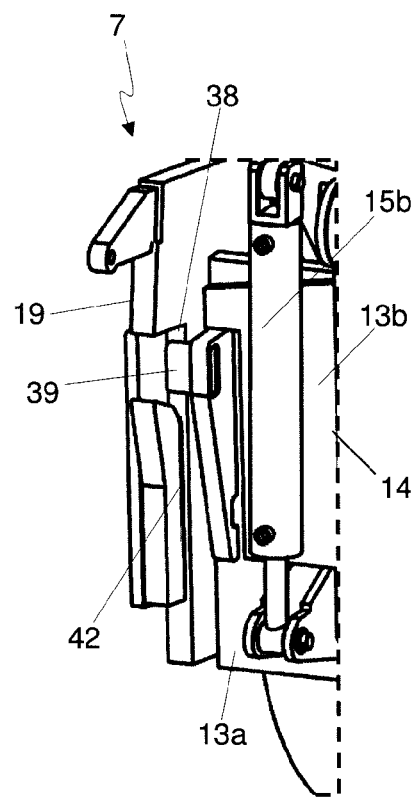
Fig. 4a
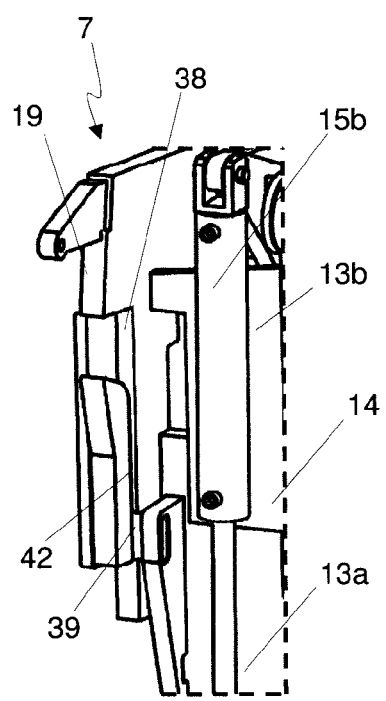
Fig. 4b

GROUND MILLING MACHINE AND METHOD FOR ADJUSTING THE STRIPPING PLATE OF A GROUND MILLING MACHINE

CROSS-REFERENCE TO RELATED APPLICATIONS

The present application claims priority under 35 U.S.C. § 119 of German Patent Application Nos. DE 10 2014 019 606.2, filed Dec. 30, 2014 and DE 10 2015 002 426.4, filed Feb. 26, 2015, each disclosure of which is hereby incorporated herein by reference in its entirety.

FIELD OF THE INVENTION

The present invention relates to a ground milling machine, particularly a road cold milling machine, as well as to a method for adjusting a stripping plate of a ground milling machine.

BACKGROUND OF THE INVENTION

Essential elements of such a ground milling machine are a machine frame supported by travelling devices, a drive engine providing the drive energy required for travelling and working operation, as well as a milling device. The milling device particularly is a milling drum, comprising a support tube equipped with a plurality of chisel devices on its outside jacket surface. The milling drum is usually arranged transversely to the working direction and horizontally with its rotation axis and mills the ground during working operation. Typical areas of application of generic ground milling machines are, for example, cold milling of bitumen surfaces, stabilizing and/or recycling of the ground or extraction of ground natural resources by means of so-called surface miners.

During working operation of such a ground milling machine, the treatment of the milled material, for example, the removal of the milled material from the region of the milling drum, is of particular importance. In order to achieve a controllable flow of the milled material, the milling drum is typically arranged in a milling drum box comprising side walls, a front wall (i.e., in the working direction in front of the milling drum) and a rear wall (in the working direction behind the milling drum) as well as a termination upward. This results in a defined inner space in which the milling drum rotates during working operation and in which the milled material is routed. Usually the milled material is either laid on the ground or supplied to a suitable transport device, for example, a conveyor belt, and thereby removed from the milling spot. In order to achieve a most clean milling bed, which is particularly desired in the case of maintenance work on road surfaces but also when extracting natural resources with a generic ground milling machine, for example, the rear wall arranged behind the milling drum in the working direction is often times at least partially configured as a so-called stripping device. Said stripping device is carried along having a bottom edge extending transversely to the milling bed and resting on said bed and strips off loose material located on the milling bed. Additionally or alternatively, a grading of the milling bed and/or the regulation of the material volume remaining on the milling bed can be achieved by means of such a stripping device, for example. Such a generic stripping device is known from DE 10 2007 038 677 B4, DE 35 280 038 C2 and DE 10 2012 012 607 A1, for example, to which reference is made hereby with respect to the application of the generic stripping device.

An essential element of the stripping device is a stripping plate, often times having an upper plate and a bottom plate. In this case, the stripping plate thus comprises two plate-type elements, the bottom plate being guided on the upper plate in a height-adjustable manner and is adjustable in its position relative to the upper plate in the vertical direction between an upper "top position" and a lowered "extension position". As a result, the bottom plate may, for example, be lowered so far (and partly even be actively pressed onto the ground of the milling bed) that it scratches over the surface of the milling bed with its bottom edge, thus forming a rearward termination which is almost tight for the milling material. As an alternative, the bottom plate may be lifted so that milled material partially or completely remains on the milling bed.

The working devices of the milling drum, for example, round shaft chisels, are subject to heavy wear due to the comparatively great material stress and thus need to be replaced regularly during working operation. This requires access to the milling drum. Further devices are also often times arranged inside the milling drum box, such as injection devices for water and/or foamed bitumen, etc., which need to be accessible for maintenance purposes. For this reason, in the region of the upper plate, and, in particular, in the region of the upper end of the upper plate, the stripping plate is often times mounted such that it can pivot about a horizontal pivot axis between a pivot-up position and a pivot-down position. The pivot-up position defines the position in which the stripping plate is pivoted upward, or folded upward, about the pivot axis. In said position, the upper plate and the bottom plate are together in the pivot-up position, so that the milling drum can be accessed from the outside, for example, for maintenance purposes. From the pivot-up position, the stripping plate may be pivoted into a pivot-down position, in which case the upper plate is pivoted downward about the pivot axis together with the bottom plate until at least the upper plate produces a spatial termination to the rear and rests in or against the side walls of the milling drum box, for example. Depending on the set height adjustment of the bottom plate on the upper plate, there will be a free space, or no free space, between the bottom edge of the bottom plate and the milling bed.

The drive of the adjustment of the stripping plate is effected via actuators, which may particularly be a pair of hydraulic cylinders. Said actuators are usually arranged non-centrally, i.e., spaced apart from one another and offset towards the edges of the milling drum box. For driving the pivot movement of the stripping plate and/or the height adjustment of the stripping plate, particularly the bottom plate on the upper plate, in each case separate actuators, as, for example, described in DE 10 2007 038 677 B4, may be used, or actuators may be used in a combined manner, as, for example, indicated in DE 10 2012 012 607 A1. It is known for hydraulic cylinders to provide manually adjustable restrictors, by means of which a reasonably synchronous operation of the actuators may be realized. However, said process is very time-consuming and needs to be repeated regularly due to the fact that friction values between the milling drum box and the stripping plate may change very rapidly during operation, for example.

It is very important for the proper handling of the adjustable stripping plate that the pivoting-up and pivoting-down of the stripping plate and/or the height adjustment of the stripping plate or at least of the bottom plate can be performed in a trouble-free and reliable manner. However, this requires a robust parallel adjustment of the at least two actuators, since otherwise the stripping plate may get jammed or blocked on the milling drum box and may impair its functionality. At the same time, such jamming or blocking increases wear to guiding elements for the stripping plate, which results in undesired reduction of its service life.

SUMMARY OF THE INVENTION

The object of the present invention is to provide an option of improving the handling of such a stripping plate and, in particular, of enabling trouble-free operation, in particular reliable height adjustment.

One aspect of the present invention is the fact that a monitoring device having at least one sensor is provided which is configured for monitoring the adjustment of the stripping plate. Specifically, the adjustment position and/or the adjustment speed are monitored. Thus, the monitoring device is basically configured in such a way that it detects the position and/or adjustment speed of the stripping plate by means of the at least one sensor. Adjustment of the stripping plate may include height adjustment of the stripping plate on the milling drum box, particularly the height adjustment of the bottom plate relative to the upper plate, and, additionally or alternatively, the pivot-up and pivot-down movement of the stripping plate relative to the remaining milling drum box, for example, in the case of maintenance work. The term monitoring device refers to the entirety used for detecting the adjustment position and/or the adjustment speed of the stripping plate. A further aspect of the present invention lies with a control device controlling the actuation movement of at least one of the actuators depending on the adjustment of the stripping plate determined by the monitoring device. Control of the adjustment movement is effected such that the stripping plate is adjusted in a most parallel manner, i.e., that ideally the at least two actuators are activated in such an inter-coordinated manner that, for example, a height adjustment of the stripping plate, and particularly of the bottom plate relative to the upper plate, is effected continuously on both sides without the stripping plate getting jammed, for example. If possible, also the pivot-up and pivot-down movement of the stripping plate is to be effected as continuously as possible in order to ensure reliable engagement of possible present locking elements, which lock the stripping plate in the pivot-down position on the milling drum box, on both sides in a safe manner. One aspect of the present invention thus lies with the interplay between the monitoring device and the control device, wherein the control device controls the adjustment process of the stripping plate depending on the sensor data determined by the monitoring device, in order to enable a continuous, synchronous and inter-coordinated operation of the at least two actuators of the stripping plate. Changes of friction values or comparable effects, which change or influence the adjustment movement caused by an actuator, are thus automatically considered when controlling the at least two actuators, so that a regular manual adjustment is no longer required.

It is ideal if the sensor of the monitoring device monitors the adjustment of at least a first actuator, and if the control device controls the adjustment of at least a second actuator. In this present embodiment, the adjustment movement of the first actuator thus defines how the control of the adjustment movement of the second actuator is effected by the control device. In other words, the provided control enables that the control of the second actuator is adjusted to the respective adjustment process of the first actuator. As a result, the first actuator thus defines the movement of the second actuator.

In order to be able to monitor the adjustment process and particularly also the control process performed by the control device in an optimum manner, it is preferred that in each case one sensor is assigned to each of the at least two actuators. The monitoring device thus detects the movements of the two actuators at the same time. This arrangement enables a particularly synchronous operation of both actuators since the control device is capable of considering changes in the operating properties of both actuators and adapting them to one another.

Basically, a plurality of different sensors may be used in the present invention. One aspect when selecting the sensors is their capability to determine the adjustment movement and/or the adjustment speed of at least one actuator. This may mean, for example, that the sensor enables detection of the adjustment movement and/or adjustment speed of the actuator directly or indirectly, for example, of the stripping plate relative to a reference, for example, the milling drum box or the machine frame, and/or of the bottom plate relative to the upper plate, etc. However, use of a sensor in the form of a distance measuring device has proved to be optimal for detecting the adjustment speed and/or adjustment movement of the actuator, which distance measuring device determines the adjustment state with respect to the adjustment speed and/or adjustment movement of the actuator per se. In this case, it is particularly preferred to use a magnetostrictive travel sensor. This sensor is hereinafter referred to as "MG sensor". The MG sensor is a travel sensor which determines the distance between two points by means of the magnetostriction. The MG sensor is particularly advantageous in that it enables a contactless and therefore practically wear-free distance measurement. Basically, the MG sensor may be realized in different ways and manners. Preferably, the MG sensor comprises a signal converter arranged on a face-sided end of a sensor rod and a position magnet which is displaceable along the longitudinal axis of the sensor rod, ideally in a contactless manner. The individual elements of the MG sensor are arranged in the actuator such that upon a change of the actuating position, the distance between the position magnet and the signal converter along the longitudinal axis of the sensor rod changes. For the actual measurement, typically a short current impulse originating from the signal converter is sent through the waveguide, which produces a first magnetic field that changes locally and runs along with the impulse. The permanent magnet guided along the sensor rod is surrounded by a second magnetic field. The encounter of the two magnetic fields triggers a torsion impulse which runs back from the originating spot as an acoustic wave at constant ultrasonic speed to the signal converter, where it is converted into a suitable signal proportional to the distance. Said signal may then be transmitted, for example, to a control device connected to the distance measuring device, respectively the monitoring device, and be displayed via a corresponding display unit. Particularly suitable to that end is a magnetostrictive position sensor integrated inside a piston-cylinder unit of a hydraulic cylinder, as inter alia disclosed in DE 10 2005 060 676 A1, to which reference is made hereby. It is therefore also preferred that the actuators are hydraulic cylinders.

For the use of hydraulic cylinders as actuators it is preferred that the control device controls a valve, particularly a proportional valve, connected upstream of at least the second actuator. In this way, a particularly robust solution may be obtained for how the control commands generated by the control device can actually be implemented at the second actuator. Such valves, particularly proportional valves, are already well established and are particularly characterized also by their high functional reliability. Furthermore, generic ground milling machines per se usually comprise one or multiple hydraulic systems so that such a configuration can be integrated in existing systems in a relatively simple manner.

For the specific implementation, a configuration has proven to be particularly advantageous where only one of the two actuators, particularly the second actuator, is controllable by the control device. This determines that in each case the first actuator is not controlled by the control device but represents the basis for the control of the second actuator. Provision may thus be made for the first actuator to comprise devices for a pre-adjustment, for example, manual pre-adjustment, such as the manually actuatable throttles known from the prior art. Particularly preferably, said pre-adjustment devices are assigned to the actuator in the feed line and/or return line of a corresponding hydraulic system via which the first actuator is operated. For the second actuator, on the other hand, no manual adjustment is provided, at least as far as the regular operation of the ground milling machine is concerned. The second actuator is ideally exclusively controlled by the control device depending on the first actuator.

A further aspect of the present invention lies with a method for adjusting a stripping plate of a milling drum box of a ground milling machine, particularly a ground milling machine as described above. Reference is made to the above statements for the structure and functionality of the stripping plate. Essential method steps are, on the one hand, direct or indirect detection of the adjustment of a first actuator by means of a monitoring device and transmission of the detected adjustment to a control device. In a further step, the method comprises controlling the height adjustment of a second actuator depending on the transmitted height adjustment of the first actuator. Detection of the adjustment of the first actuator particularly includes a detection with regard to the adjustment speed and/or adjustment position. Detection may be effected directly on or in the actuator or also indirectly, for example, at parts moved by the actuator, particularly the bottom plate, relative to a reference point, for example, at the machine frame or the milling drum box. One aspect of the method according to the present invention is that the first actuator dictates the adjustment of the second actuator. This way, disturbances during the adjustment process can be removed or compensated automatically without an individual and manual re-adjustment being required.

In a refinement of the method according to the present invention, provision is further made for the monitoring device to monitor the adjustment of both actuators by means of suitable sensors. This way it is ensured that the control of the second actuator has the desired effect, i.e., continuous adjustment of both actuators.

Preferably, control is effected such that the first and the second actuator adjust the stripping plate in a parallel manner. This means that the stripping plate is pivoted, typically horizontally, about a shared axis and/or is displaced in parallel in the vertical direction in a continuous manner. Depending on the specific configuration of the pivoting mechanism, a pivoting may also follow a displacement or vice versa.

Ideally, controlling by the control device comprises actuating a valve, particularly a proportional valve, connected upstream the second actuator. The actuators are hydraulic cylinders in this case. Control via valves, particularly proportional valves, enables a particularly reliable performance of the method according to the present invention.

BRIEF DESCRIPTION OF THE DRAWINGS

The present invention will be described in more detail below with reference to the exemplary embodiments shown in the figures. In the schematic figures:

FIG. 3 is a perspective inclined view from the rear right side of a milling drum box with a stripping plate pivoted-up and a lifted bottom plate;

FIG. 4a is an enlarged detail view of the guide insertion between stripping plate and milling drum box with the bottom plate lifted;

FIG. 4b is an enlarged detail view of the region shown in FIG. 4a with the bottom plate lowered;

Like components are designated by like reference numerals in the drawings, however not all repeating components are necessarily designated in each figure.

DETAILED DESCRIPTION OF THE INVENTION

Figure 1:
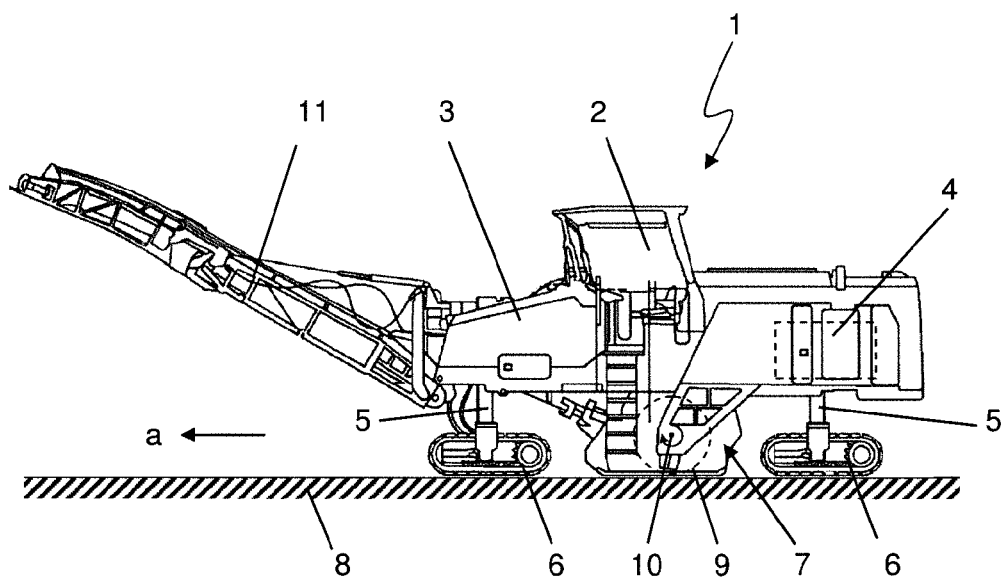
FIG. 1 is a side view of a ground milling machine.

FIG. 1 shows a generic ground milling machine 1, in this case a road milling machine, respectively a cold milling machine. Said machine comprises an operator's platform 2, a machine frame 3, a drive engine 4 and travelling devices 6 connected to the machine frame via lifting columns 5. During operation of the ground milling machine 1, the ground 8 to be milled off is removed in the working direction a by means of a milling drum 9 which is mounted in a milling drum box 7 to be rotatable about a rotation axis 10 extending horizontally and transversely to the working direction a, the milling drum box 7 being connected to the machine frame 3 and arranged centrally between the front and rear travelling devices. The milled material is loaded to a transport vehicle not shown in the figures via a discharge belt 11 and is transported away by said transport vehicle.

Figure 2:
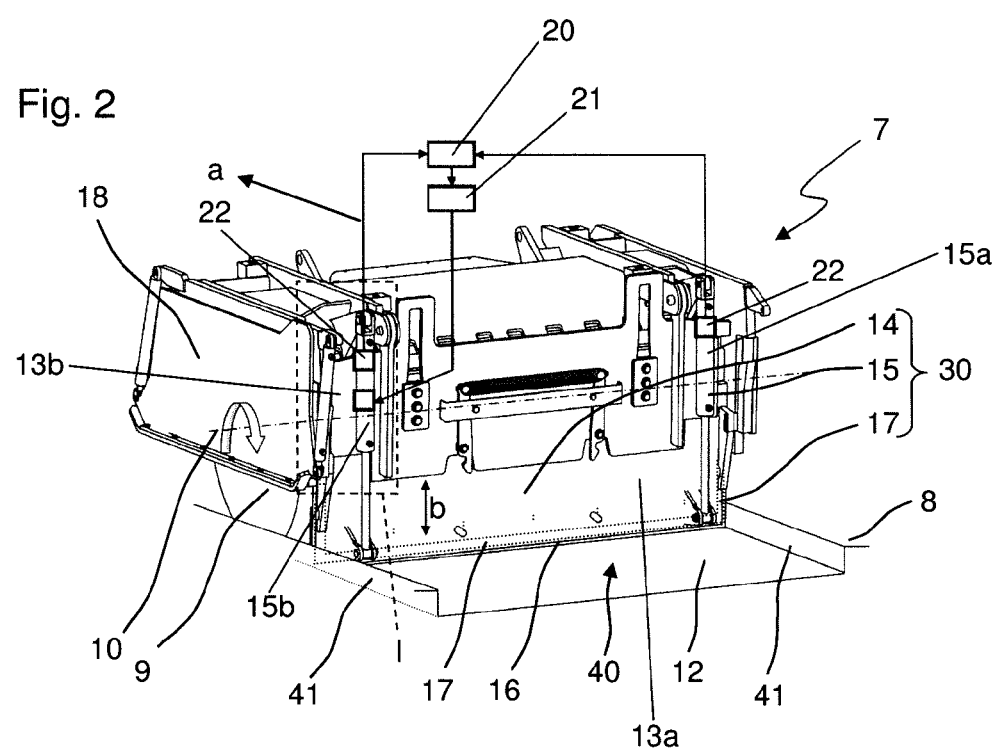
FIG. 2 is a perspective inclined view from the rear left side of a milling drum box with a stripping plate pivoted-in and a lowered bottom plate.

The structure and function of the milling drum box 7 are described in FIGS. 2 and 3, although the present invention is also applicable to milling drum boxes of different designs. FIG. 2 shows the milling drum box with a stripping plate pivoted down and with a lowered bottom plate, and FIG. 3 shows the milling roller box with a stripping plate pivoted up and its bottom plate lifted.

The milling drum box 7 is limited to both sides, which are intersected by the rotation axis 10 of the milling drum 9, by side plates 13. The removal of milled material is effected in a known manner in the working direction to the front. The side located at the rear in the working direction a is essentially formed by the stripping device 30, which comprises a stripping plate 14, a height adjustment device with two actuators 15a and 15b in the form of hydraulic cylinders 15, and a stripping bar 17. The stripping plate 14 comprises a bottom plate 13a and an upper plate 13b. The bottom plate 13a is mounted on the upper plate 13b so as to be longitudinally displaceable and, in the pivot position shown in FIG. 2, can be adjusted relative to the upper plate 13b in the arrow direction b by means of the actuators 15a and 15b. In FIG. 2, the stripping plate 14 is pivoted down and the bottom plate 13a is in a position lowered relative to the upper plate 13b. During working operation of the ground milling machine 1, said machine mills the ground 8 by rotation of the milling drum 9 with the chisel devices (not shown) arranged thereon and discharges the loosened milled material via the discharge belt 11. A milling track 40 having milling edges 41 and a milling bed 12 is formed in the ground 8. The depth of the milling bed 12 depends on the set milling depth of the ground milling machine 1. The stripping device 30 can be adjusted by means of the height adjustment device 15. The stripping plate 14 is guided either directly on the milling bed 12 in a scratching manner or above the milling bed 12. In the first case, almost no milled material remains on the milling bed 12, whereas in the second case milled material is left in the milling bed 12.

The stripping plate 14 fulfills multiple functions. On the one hand, it strips over the milled-off surface of the milling bed with its bottom edge 16 behind the milling drum 9 when the bottom plate 13a is lowered and thus scratches milled material into the interior of the milling drum box 2 when in a position resting on the milling bed. As an alternative, the stripping plate 14 may also be adjusted such that its bottom edge 16 is spaced apart from the milling bed and carried along during the milling process. Then, for example, a certain amount of milled material is left on the milling bed during the milling process. On the other hand, the milling drum 9 mounted in the milling drum box 7 can also be accessed via the stripping plate 14, for example, for maintenance works, in order to replace worn-off milling chisels. In order to enable these two functions, the stripping plate 14 is, on the one hand, mounted on the milling drum box 7 (FIG. 3) so as to be pivotable in the upward direction about a pivot axis c and, on the other hand, the bottom plate 14 can be lifted and lowered, or linearly adjusted, respectively, on the upper plate 15 in order to enable regulating the height position of the bottom edge 16 of the stripping plate 13 relative to the surface of the milling bed.

In order to hold the stripping plate 14 in its position in the pivoted-down state during the milling process, provision is made for the stripping plate to be locked at the milling drum box. This is described in further detail in FIGS. 4a and 4b. Both Figures show the left rear lateral region of the milling drum box 7, FIG. 4a showing the unlocked state with lifted bottom plate 13a and FIG. 4b showing the locked state (corresponding to FIG. 2) with lowered bottom plate 13a.

Parts of the locking mechanism are a pivot stop 38 on the side wall 19 of the milling drum box 7, against which a counter stop 39 (specifically a slide block) comes to rest in the pivot-down position of the stripping plate 13. The counter stop 39 is configured such that it protrudes outward from the external side of the bottom plate 13a and that it overlaps the side edge region of the bottom plate 13a to the side wall 11 of the milling drum box 7, whereby a pivot obstacle is achieved in the pivot-in direction by means of the pivot stop 38 and the counter stop 39. When the bottom plate 13a is lowered from said position in FIG. 4a, the nose-type counter stop 39 engages a holding groove 42 and is thus arrested in the pivot-out direction. Further details on the functionality of said exemplary embodiment can be taken from DE 10 2012 012 607 A1, to which reference is hereby made.

One aspect of the present invention is that the ground milling machine 1 further comprises a monitoring device 20 and a control device 21, by means of which a reliable adjustment of the bottom plate 13a relative to the upper plate 13b (lifting and lowering) and also of the stripping plate 14 per se (in particular, up- and downward pivoting relative to the milling drum box 7) is ensured. In particular, a jamming of the stripping plate 14 and especially of the bottom plate 13a is prevented by means of said two devices and a safe insertion of the counter stop 39 into the holding groove 42 is enabled. In this regard, it is essential that the present invention is applicable with reference to the monitoring device 20 and the control device 21 also to stripping plates 14 which are only height-adjustable but not pivotable relative to the milling drum box 7.

The object of the monitoring device 20 essentially is to detect the adjustment speed and/or the adjustment position of the actuator 15a and/or 15b. This may, on the one hand, be effected indirectly such that the relative position of the stripping plate 14 is monitored, for example. However, direct monitoring of the adjustment position of the actuators 15a and 15b, which is also indicated in the present exemplary embodiment, is preferred. Both actuators 15a and 15b are configured as linear actuators, specifically as hydraulic cylinders. Thus, actuation of such an actuator leads to the piston to be pushed out of the cylinder or retracted. In the present exemplary embodiment, in each case one sensor 22 as a part of the monitoring device is provided for both actuators 15a and 15b, by means of which the actuating position of the two actuators 15a and 15b can be detected. Said sensors 22 are schematically illustrated in FIG. 2. The sensor data determined by the monitoring device 20 is transmitted to the control device 21, which now controls one of the actuators (in the present exemplary embodiment the left actuator 15b) such that it is adjusted as synchronously as possible together with the right actuator 15a. The interplay between the monitoring device 20 including sensors 22 with the control device 21 thus enables that the two actuators 15a and 15b are adjusted with respect to one another in a continuous and similar manner, so that the stripping plate 14 and particularly the bottom plate 13a is synchronously adjusted on both sides by the two actuators 15a and 15b. As a result, the pivoting movement of the stripping plate 14 around the pivot axis c and particularly the displacement movement of the bottom plate 13a relative to the upper plate 13b along the arrow direction b are performed in a parallel fashion on both sides and a both-sided insertion of the counter stop 39 into the holding groove 42 is ensured, and a jamming of the bottom plate 13a can be reliably prevented.

In the present case, the sensors 22 are distance measuring devices of the type "magnetostrictive sensor". Such a sensor comprises a cylinder sensor element arranged in the cylinder of the actuator 15 and a piston sensor element arranged in the piston 7. By means of the sensor, the changes of the stroke position of the respective actuator can be determined. Such type of sensors is known per se from the prior art. One aspect here is that one advantage of said sensors is the fact that they can be arranged within the actuator 15a/b.

Figure 5:
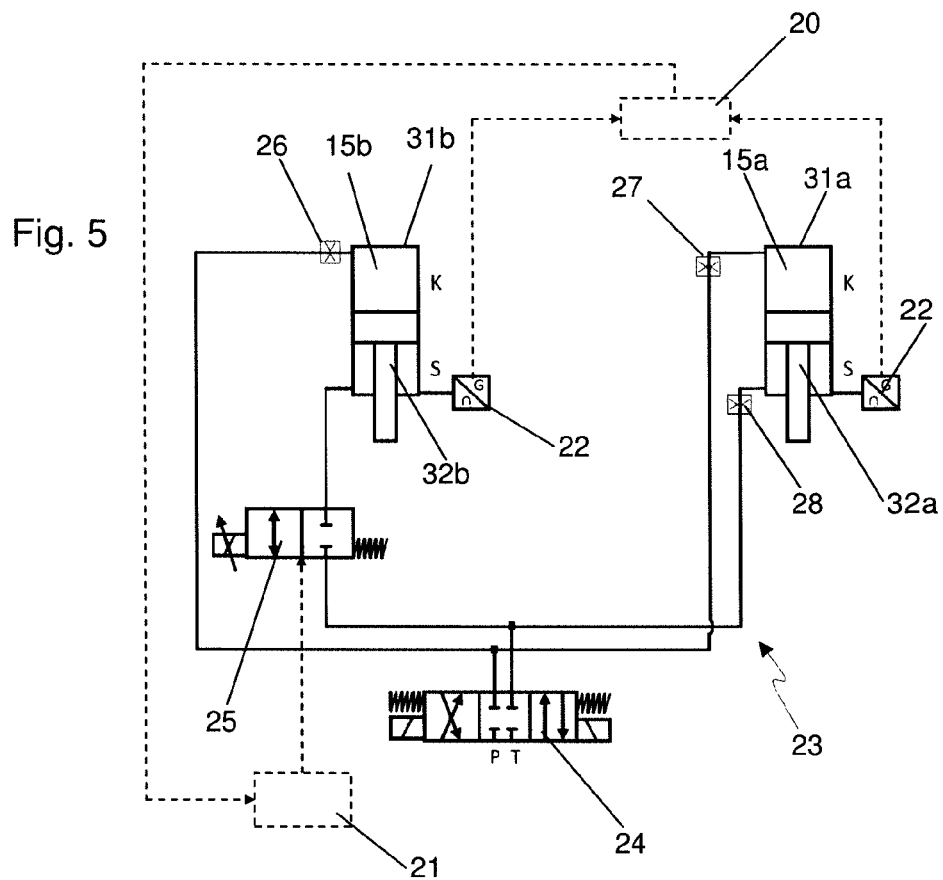
FIG. 5 is an exemplary hydraulic circuit diagram.

FIG. 5 illustrates in an exemplary manner the two actuators 15a and 15b in a possible hydraulic circuit arrangement, which enables controlling actuator 15b depending on the adjustment of the other actuator 15a in accordance with the above explanations. Elements of the hydraulic system 23 are a 4/3-way proportional valve 24, a proportional valve 25 and manually adjustable throttles 26, 27 and 28. Connection to a hydraulic fluid supply (T tank and P pump) is effected via the 4/3-way proportional valve 24. The two actuators 15a and 15b are both connected in parallel to the valve 24 via feed and return lines. Throttles 27 and 28 are arranged between the valve 24 and the actuator 15a in the lines leading to the actuator 15a, via which throttles the flow rate of the hydraulic fluid can be preset. In contrast to this, in a line leading to the actuator 15b between the valve 24 and the actuator 15b is disposed a proportional valve 25 in place of a manually-actuatable throttle/restrictor. Said proportional valve is controlled by the control device 21 such that the actuator 15b is adjusted synchronously to the actuator 15a. In order to enable this, the two actuators 15a and 15b comprise the distance measuring sensors 22. Said sensors determine the relative adjustment of the piston 32a, respectively 32b, relative to the cylinder 31a, respectively 31b, of the respective actuator 15a, respectively 15b, and transmit the corresponding sensor data to the monitoring device 20, which in turn is connected to the control device 21. The latter then controls the proportional valve 25 such that both actuators are adjusted synchronously.

Figure 6:
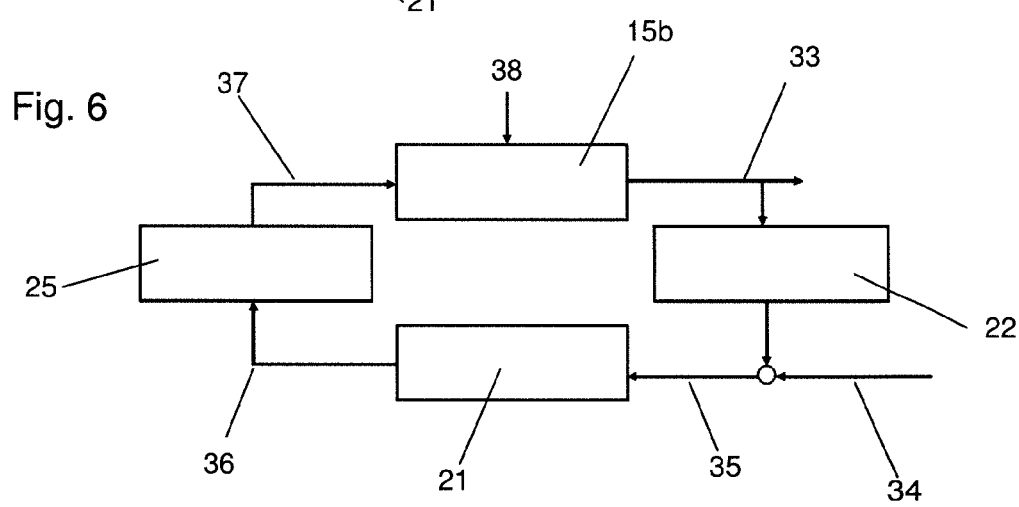
FIG. 6 is a flow chart of a control circuit according to the present invention.

The control circuit underlying said function is described in greater detail in FIG. 6. In this case, the control variable 33 is the position of the left actuator 15b (control distance). Said position is determined by the sensor 22 (distance measuring device) at the actuator 15b. The reference variable 34 is the adjustment position of the right actuator 15a, which is determined via sensor 22 at actuator 15a and supplied to the control device 21 via the monitoring device 20. In the case of a control deviation 35, the control device 21 generates a control variable 36 for controlling the proportional valve 25 so that the actuator variable 37 (oil volume) is adjusted correspondingly. By means of the above-described control circuit, it is thus enabled that the adjustment of the left actuator 15b by means of the control device 21 is controlled in such a manner depending on the right actuator that both actuators 15a and 15b travel over equal adjustment distances synchronously to one another and the stripping plate 14 is thus guided without jamming. Possible disturbance variables 38 affecting said adjustment process, such as dirt located on the bottom plate, can be automatically compensated in this way.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A ground milling machine, comprising:
   a machine frame supported by travelling devices,
   a drive engine,
   a milling device arranged in a milling drum box, the milling drum box comprising a stripping plate which is height-adjustable by at least a first and a second actuator,
   wherein a monitoring device having at least one sensor is provided which is configured for monitoring an adjustment of the stripping plate, and
   further wherein a control device is provided which controls actuation of at least one of the actuators depending on the adjustment of the stripping plate determined by the monitoring device.

2. The ground milling machine according to claim 1, wherein the sensor monitors the adjustment of at least a first actuator, and the control device controls the adjustment of at least a second actuator.

3. The ground milling machine according to claim 1, wherein in each case one sensor is assigned to each of the at least two actuators.

4. The ground milling machine according to claim 1, wherein the sensor is a distance measuring device.

5. The ground milling machine according to claim 1, wherein the actuators are hydraulic cylinders and the control device controls a valve connected upstream of at least the second actuator.

6. The ground milling machine according to claim 1, wherein only one of the two actuators is controllable by the control device.

7. The ground milling machine according to claim 1, wherein throttles are assigned to the first actuator in the feed and/or return line.

8. A method for adjusting a stripping plate of a milling drum box of a ground milling machine according to claim 1, comprising the following steps:
   a) detecting the adjustment of a first actuator via a monitoring device (20) and transmitting the detected adjustment to a control device; and
   b) controlling the height adjustment of a second actuator depending on the transmitted adjustment of the first actuator.

9. The method according to claim 8, wherein controlling is effected such that the first and the second actuator adjust the stripping plate in parallel.

10. The method according to claim 9, wherein controlling by means of the control device comprises actuating a valve connected upstream of the second actuator.

11. The ground milling machine according to claim 1, wherein the ground milling machine comprises a road milling machine.

12. The ground milling machine according to claim 4, wherein the sensor comprises a magnetostrictive travel sensor.

13. The ground milling machine according to claim 5, wherein the valve comprises a proportional valve.

14. The ground milling machine according to claim 6, wherein the second actuator is controllable by the control device.

15. The method according to claim 8, wherein the ground milling machine comprises a road milling machine.

* * * * *